July 24, 1956
H. A. HEDLAND
2,755,814
KEY MEANS FOR ORIENTING APPLIANCES
IN FLUID LINES AND THE LIKE
Filed Sept. 7, 1951
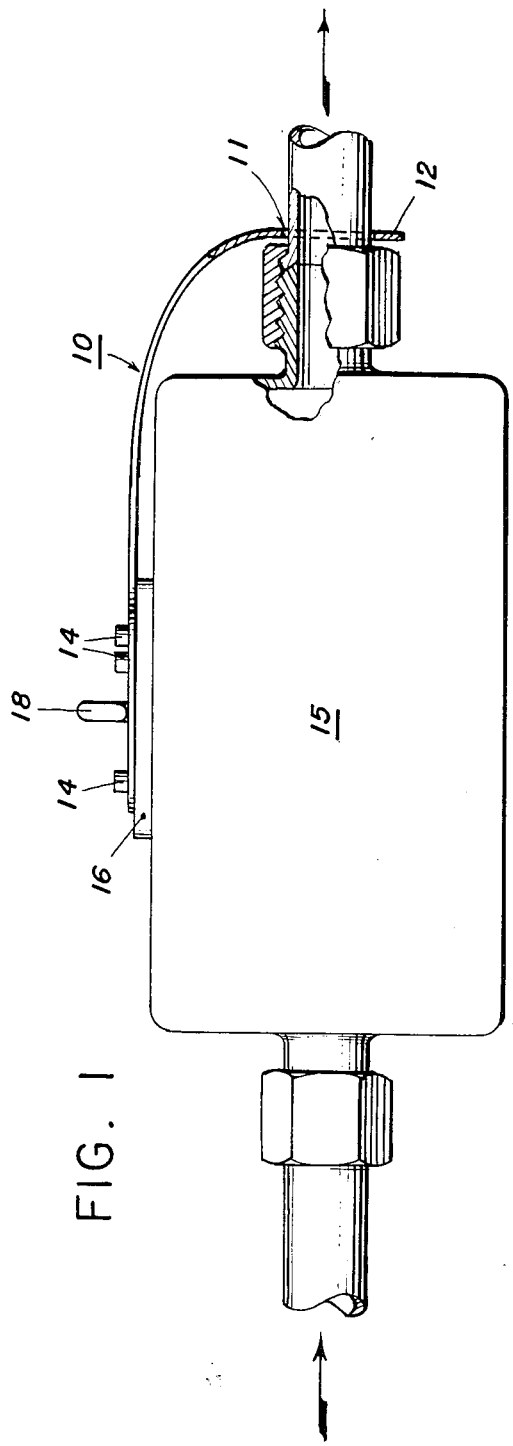
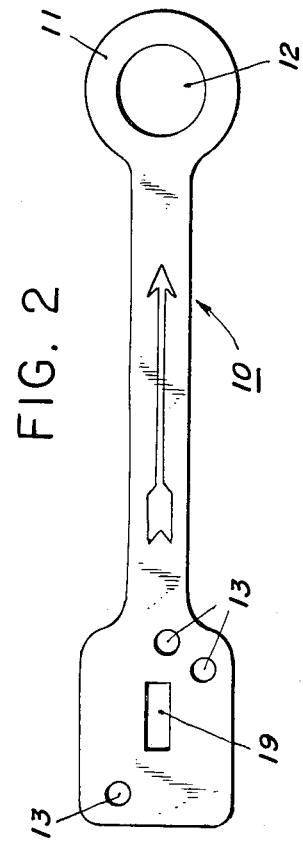
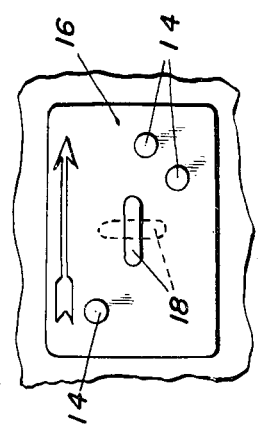
INVENTOR
HARRY A. HEDLAND,
R. C. Rehm
BY
ATTORNEY United States Patent Office 2,755,814
Patented July 24, 1956

2,755,814

KEY MEANS FOR ORIENTING APPLIANCES IN FLUID LINES AND THE LIKE

Harry A. Hedland, Evanston, Ill., assignor to William Waterman, Evanston, Ill.

Application September 7, 1951, Serial No. 245,624

8 Claims. (Cl. 137—315)

This invention relates to selectors for insuring the proper placing or orienting of the correct appliance such as a valve, regulator, fuse, etc., in fluid or other lines.

A selector associated with the line keyed to interengage only with corresponding key means on the appliance intended for coupling in the line, makes it possible easily to determine whether the proper appliance is placed in the line and whether it is correctly oriented in the line.

The nature and further objects and advantages of the invention will readily appear from the following description of one embodiment of the invention illustrated in the accompanying drawing.

In said drawing:

Figure 1 is an elevation, partly in section of an appliance coupled in a fluid line and provided with key means mating with a keyed selector attached to the line;

Fig. 2 is a plan view of a keyed selector; and

Fig. 3 is a plan view of the key means on the appliance.

Most appliances adapted to be inserted or coupled in fluid or other lines are equipped with standard or uniform coupling elements (e. g., pipe or tube couplings) which make it possible to connect the wrong appliance in the line or improperly to insert in the line the correct appliance but in reversed position. In many cases an improper or improperly oriented appliance in the line may be disastrous; and in any case the function of such appliance would be lost. Improper assembly of such appliance in a line is relatively common because replacement and service is done elsewhere by workmen having no knowledge of the nature and function of the appliance. It has been the practice, for example, to place an arrow on the appliance to indicate that the appliance should be inserted so that the arrow corresponds with the direction of flow; but often the workman who services the appliance or replaces it is ignorant of the direction of flow or ignores the directions on the appliance. As a further illustration, in aircraft, a multitude of various valves, flow and pressure regulators, fuses, check valves, etc., must be coupled in lines for air, hydraulic fluid, fuel, oil, oxygen and de-icing fluid. Some lines are high pressure and others are low pressure. Appliances designed for low pressure are incapable of withstanding the pressure in high pressure lines; some are incapable of operating properly when used with fluids other than those for which they are designed. A hydraulic check valve placed in a pneumatic line would leak. Other serious consequences might result by either placing the wrong device in the line or orienting it improperly. Considerable skill is required to make a proper selection of the appliance to be coupled in a given line and to orient it correctly. Such skill is available at the factory but seldom is available where servicing, repair and replacement is performed.

The illustrative keyed selector comprises an element attached to or around the line adjacent the coupling by skilled workmen fully conversant with the nature and function of the appliance to be connected in the line. Such element is keyed to fit or interlock only with corresponding or mating key means on the proper appliance to be coupled in the line and only when such appliance is properly placed in the line. If the two key means will not mate or interlock, the assembler, service man or inspector knows at once that either the incorrect appliance was selected or it was improperly oriented (e. g. reversed) in the line.

The aforesaid keyed element is here shown in the form of a flexible metal strip 10 having at one end means for connecting it to a line. Such means are here represented by an enlarged portion 1 at one end of the strip having therein a hole 12 by which the element may be slipped over the line and located adjacent the coupling. Other means for attaching the element to the line may be employed. The other end is provided with the key means 13 having an individual formation, here represented by a plurality of holes having a special arrangement, number, size or shape individual to the mating key means 14 on the appliance 15. The latter mating key means is here represented by a plurality of pins carried by the appliance and corresponding in number, shape, size and arrangement with the holes comprising the key means 13 and over which the latter is adapted to fit, but only when the correct appliance has been connected in the line in the proper orientation. The key means 14 may advantageously be mounted on a plate 16 which may be attached to the appliance and preferably bearing some notation by which it can be identified with the particular appliance for which it is intended. The term "appliance" is used for convenience in a generic sense to designate any device adapted to be coupled in a fluid line.

In the present illustration three holes and pins are employed to form the mating key means. These are so arranged and spaced that if the appliance be reversed in the line, the key element 13 cannot fit over the key element 14 on the appliance. As an additional device for indicating improper assembly, a fastening device is associated with the key means, which device is operative only when the key means are properly mated. The illustrative fastening device is here shown in the form of a conventional turn-button 18 associated with the key means 14 and mounted on plate 16 and adapted to pass through a slot 19 in the key element 10 but only when the key means 13 on the latter pass over the pins 14. When thus in position the button 18 projects through the slot 19 and can be turned 90° (as indicated in dotted lines in Fig. 3) to fasten the key means 13 in place. A simple inspection requiring no knowledge of the function or correct assembly of the appliance will reveal whether the correct appliance has been correctly assembled in the line. If incorrectly assembled or the improper appliance coupled in the line, the key means 13 cannot slip over the pins 14 and the button cannot therefore be turned to fasten the element 10 in place.

Preferably the keyed selector 10 is made long enough only to extend from the coupling to the key means 14 on the appliance eliminating any surplus length which might permit the strip to be twisted half a turn to interlock with the key means in a case where the correct appliance is coupled in reversed position in the line. In this connection, it will be understood that the appliance represented at 15 is illustrative only and that the appliances may vary considerably in shape and size, necessitating a selector of a length adjusted to the particular appliance for which it is intended. Also the key means 14 is preferably placed midway of the length of the appliance so that there will be no slack in the key element 10 (which would permit application in twisted position) regardless of the orientation of the appliance in the line.

It is necessary, of course, that the keyed selector 10 be located adjacent the proper coupling in the line, in this case the down-stream coupling as indicated on the key element. Incorrect location of the element 10 would defeat its purpose. However, incorrect application or incorrect selection of the proper key element is much less likely because the key elements will be applied at the factory by expert technicians who are much less likely to make a mistake.

Each kind and size of appliance must have a special key element 10, but it will be apparent that even with simple key means such as two or three round pins and holes in association with the turn-button and slot 19, a large number of special key arrangements each peculiar to a particular appliance, may be made merely by varying only the position and spacing of the holes and pins. If necessary a very great multiplication of key means may be obtained by used of different numbers, shapes and sizes of pins and holes. Preferably the various arrangement of pins and holes should differ from each other sufficiently to avoid attempts to force a key means 13 over the wrong key means 14. With substantial differences between the key arrangements, it is possible to design mating key arrangements so that they fit together easily and without the use of force, thereby making it simple to discover improperly assembled appliances. It will be understood that the key means is not limited to pins and holes, since other mating key elements may be employed. However, pins and holes have the advantages of simplicity and low cost.

Keyed selectors of this character greatly reduce assembly and inspection costs besides eliminating the often serious consequences of improper assembly.

Obviously the invention is not limited to the details of the illustrative embodiment of the invention herein described and claimed, since these may be variously modified. Moreover it is not indispensable that all features of the invention be used conjointly since various features may be used to advantage in different combinations and subcombinations.

Having described my invention I claim:

1. The combination with a line or the like having two portions with identical coupling means for coupling to an appliance, of an appliance connected to said line coupling means by identical couplings which are adapted to be connected in a plurality of positions in said line, only one of which is proper, a flexible selector attached at one end adjacent a predetermined coupling means, said appliance having key means on its surface peculiar to the specific appliance, said selector having adjacent its other end a keyed element adapted to interfit with said key means on the appliance only when the proper appliance is connected in properly oriented position in the line, said key means being in the form of a plurality of pins projecting from the appliance and having an arrangement peculiar to the appliance, said keyed element having a plurality of holes therein having an arrangement peculiar to the particular appliance proper for connection in and properly oriented in said line, whereby said selector can be fitted over said pins only when the proper appliance is connected in said line in properly oriented position.

2. In means for assisting the proper orientation of an appliance in a line or the like having two portions with identical coupling means for coupling to said appliance, the combination comprising an appliance having a plurality of identical couplings adapted to be connected in a plurality of positions in the line, only one of which is proper, a selector having means at one end for connecting the same in predetermined orientation to the line, said appliance having key means on its surface peculiar to the specific appliance, said selector having adjacent to its other end a keyed element arranged to interfit with said key means on the appliance only when the proper appliance is connected in the line in properly oriented position with respect to said keyed element of the selector, said appliance and selector also being provided with cooperating fastening means adapted to interlock when the said pins and holes interfit.

3. In means for assisting the proper orientation of an appliance in a line or the like having two portions with identical coupling means for coupling to said appliance, the combination comprising an appliance having a plurality of positions in the line, only one of which is proper, a flexible selector having means for connecting one end of the same adjacent a predetermined coupling means to the line, said appliance having key means on its surface peculiar to the specific appliance, said selector having adjacent its other end a keyed element arranged to interfit with said key means on the appliance when the proper appliance is properly oriented for connection in the line, said selector and appliance having cooperating fastening means adapted to be fastened together only when the selector is interfitted with the said key means on said appliance.

4. In means for assisting the proper orientation of an appliance in a line or the like having two portions with identical coupling means for coupling to said appliance, the combination comprising an appliance having a plurality of positions in the line, only one of which is proper, a selector having means for connecting the same at one end to the line, said appliance having key means on its surface peculiar to the specific appliance, said selector having adjacent its other end a keyed element arranged to interfit with said key means on the appliance only when the proper appliance is connected in properly oriented position with respect to the keyed element on the selector, said key means and keyed element comprising pins and holes having an arrangement peculiar to the specific appliance and arranged to interfit only when the proper appliance is connected in the line in properly oriented position with respect to said keyed element.

5. The combination of a line or the like having two portions with identical coupling means for coupling to an appliance, an appliance connected to said line coupling means by identical couplings which are adapted to be connected in a plurality of positions in said line, only one of which is proper, a flexible selector attached at one end to the line adjacent a predetermined line coupling means, said appliance having key means on its surface peculiar to the specific appliance, said selector having adjacent its other end a keyed element oriented to interfit with said key means on the appliance only when the proper appliance is connected in proper position in the line.

6. The combination comprising an appliance coupled in a line and having identical coupling means which adapt the appliance to be coupled in the line in a plurality of positions, only one of which is proper, keyed selector means for detecting improper assembly of the appliance in the line and comprising a flexible strip having a hole in one end through which the line passes to attach the selector with the line, the other end of said selector being formed with a plurality of holes having an individual arrangement and the appliance having projections complementary in arrangement with said holes and located on said appliance to register with the holes in said selector only when the said appliance is coupled in proper position in the line.

7. The combination comprising an appliance coupled in a line, said appliance having identical coupling means which adapt the appliance to be coupled in the line in either of two positions, only one of which is proper and having key means oriented thereon with respect to the proper position of the appliance in the line, and a keyed selector for detecting improper assembly of the appliance in the line and comprising a flexible element attached at one end to the line against accidental displacement and having at its other end a keyed device adapted to extend to and interfit with said key means on said appliance, said keyed device being located on said selector to interfit with the said key means only when said appliance is properly oriented in said line, said appliance having selector fastening means, said selector being slotted to receive said fastening means on the appliance when the key device of the selector is interfitted with the key means on the appliance.

8. The combination comprising an appliance coupled in a line, said appliance having identical coupling means which adapt the appliance to be coupled in the line in either of two positions only one of which is proper and having key means oriented thereon with respect to the proper position of the appliance in the line, and a keyed selector for detecting improper assembly of the device in the line comprising a flexible strip having a hole in one end through which said line passes to attach the selector to the line with respect to the proper position of the appliance in the line, the other end of said selector being formed with a plurality of holes having an individual arrangement to key the selector for application only to the key means of a particular appliance when coupled properly in the line, said appliance having selector fastening means, said selector also being provided with a fastening element adapted to interlock with said fastening means on the appliance only when the holes in said selector mate with said key means on said appliance.

References Cited in the file of this patent

UNITED STATES PATENTS

| | | |
|---|---|---|
| 203,513 | West | May 7, 1878 |
| 535,548 | Michel | May 12, 1895 |
| 795,027 | Connell | July 18, 1905 |
| 998,531 | Ketelsen | July 18, 1911 |
| 1,027,579 | Wright | May 28, 1912 |
| 1,074,100 | Behr | Sept. 30, 1913 |
| 1,448,720 | Bettieu | Mar. 20, 1923 |
| 1,981,751 | Passler | Nov. 20, 1934 |
| 2,404,858 | McLaren | July 30, 1946 |
| 2,426,991 | Emrick | Sept. 9, 1947 |
| 2,573,235 | Walters | Oct. 30, 1951 |

FOREIGN PATENTS

| | | |
|---|---|---|
| 4,892 | Great Britain | of 1881 |